United States Patent [19]

Boguslawski

[11] Patent Number: 4,462,691
[45] Date of Patent: Jul. 31, 1984

[54] MIXER/EXTRUDER HAVING SELECTIVELY VARIABLE SHEARING ACTION THEREIN

[75] Inventor: Jan J. Boguslawski, New York, N.Y.

[73] Assignee: Uniroyal, Inc., New York, N.Y.

[21] Appl. No.: 457,793

[22] Filed: Jan. 13, 1983

[51] Int. Cl.³ .............................................. B29B 1/06
[52] U.S. Cl. ...................................... 366/80; 366/89; 366/90; 366/99; 366/322; 74/89.14; 74/104
[58] Field of Search .................... 366/76, 77, 79, 80, 366/88, 89, 90, 96, 97, 98, 99, 318, 322, 323, 324; 74/89.14, 104, 107; 100/148; 425/202, 205, 207, 208, 209

[56] References Cited

U.S. PATENT DOCUMENTS

| | | | |
|---|---|---|---|
| 2,744,287 | 5/1956 | Parshall et al. | 18/12 |
| 3,102,694 | 9/1963 | Frenkel | 241/251 |
| 3,102,716 | 9/1963 | Frenkel | 259/3 |
| 3,102,717 | 9/1963 | Frenkel | 259/7 |
| 3,164,375 | 1/1965 | Frenkel | 259/3 |
| 3,375,549 | 4/1968 | Geyer | 18/12 |
| 3,486,192 | 12/1969 | Le Roy | 18/12 |
| 3,672,641 | 6/1972 | Slaby | 366/90 |
| 3,981,658 | 9/1976 | Briggs | 366/80 |
| 4,107,788 | 8/1978 | Anders | 366/90 |
| 4,178,104 | 12/1979 | Menges et al. | 366/80 |
| 4,199,263 | 4/1980 | Menges et al. | 366/90 |

Primary Examiner—Robert W. Jenkins
Assistant Examiner—Arthur D. Dahlberg
Attorney, Agent, or Firm—Jack Posin

[57] ABSTRACT

An extruder, including a rotor and a barrel, having mixing or working zones therein in which the material being mixed or worked is transferred layer by layer from upstream grooves in the rotor to input grooves in the barrel, and from output grooves in the barrel, which grooves are interleaved with the input grooves, layer by layer back to downstream grooves in the rotor. The input and output grooves of the barrel are intercommunicated by means of corresponding channels each of which has a selectively radially movable throttling member positioned therein for varying the cross-sectional opening of the channel in which it is positioned and, thus, the amount of shearing action and work performed on the material passing through such channel.

10 Claims, 5 Drawing Figures

MIXER/EXTRUDER HAVING SELECTIVELY VARIABLE SHEARING ACTION THEREIN

This invention relates to apparatus for mixing or working one or more flowable media, optionally in combination with powders, liquids or gases, where said flowable media may be of any consistency including that of a stream of discrete particles such as lumps or powders or that of a visco-elastomeric solid. It is particularly, though not exclusively, concerned with viscoelastic media such as rubber and rubber-like materials.

Continuously operating extrusion apparatus is known comprising a rotor and a barrel, the rotor having an external helical thread and the barrel having an internal helical thread of opposite hand to but coaxial with the helical thread on the rotor, the threads together forming a mixing or working (hereinafter mixing/working) zone in which, over a given axial length, the thread in one component (e.g., in the rotor) varies from a full cross-sectional area to substantially zero cross-sectional area while the thread in the other component (e.g., in the barrel) varies from substantially zero cross-sectional area to full cross-sectional area, and vice versa for a following mixing/working zone, if any. Extrusion apparatus of the foregoing type may be seen in U.S. Pat. No. 2,744,287 to C. M. Parshall et al. In operation, a medium being transported or moved in one component at the entry of the mixing/working zone of the type shown in said U.S. patent will be transferred layer-by-layer from the one component (giver) to the other component (taker) into which substantially all of the medium will have been transferred by the end of the mixing/working zone, the medium having been mixed and worked layer-by-layer during this transfer in accordance with the conditions of relative motion between the two components.

Although successful cold-feed extruders and mixer/extruders have been made employing the giver-taker principles of the aforesaid patent, the shear rate and consequently the working of the media passing through such an extruder is low, necessitating the provision of many mixing/working zones within the extruder and, consequently, requiring an elongated, expensive apparatus having a high length to diameter (L/D) ratio. Moreover, early versions of such extruders contained no features therein by means of which the user could vary the shear rate and the amount of working of the media passing therethrough. Thus, these extruders lacked flexibility and could only be used to work or mix media that fell within a limited range of characteristics.

Attempts to overcome some of the limitations of the foregoing extruders were made as represented, for example, by U.S. Pat. Nos. 3,102,694, 3,102,716, 3,102,717 and 3,164,375, all to M. S. Frenkel. In each of these cases, the mixing/working zone of the rotor and the surrounding, cooperating portion of the barrel are provided with a frusto-conical interface which allows adjustment of the clearance between the rotor and barrel upon the axial shifting of one of these members relative to the other. Although this gave some degree of flexibility to the extruders on which they were used, this was achieved at a detriment to the quality of the mixing and the working of the media in the extruder.

Other approaches to the problems of obtaining higher shear values, mixing effects and flexibility in a relatively shorter extruder have been attempted such as, for example, those shown in U.S. Pat. No. 3,375,549 to P. Geyer, which is assigned to the assignee of the present invention, and U.S. Pat. No. 3,486,192 to G. Le Roy. In these patents mixing/working zones are provided in which input grooves are interleaved with output grooves throughout an axial extent of the rotor, with the input grooves being blind-ended at the downstream end of the mixing/working zone and the output grooves being blind-ended at the upstream end of the mixing/working zone. The flow of the media being mixed/worked is over the threads or lands which separate the input and output grooves, through the clearance which separates the outer surface of the lands from the inner surface of the barrel. In the aforesaid Geyer patent the grooves are helically arranged in the mixing/working zone, whereas in the Le Roy patent they are generally axially arranged. Le Roy, moreover, discloses one embodiment in which the mixing/working zone of the rotor and the surrounding barrel are provided with a frusto-conical interface to allow adjustment of the clearance therebetween upon axial movement of the rotor relative to the barrel.

The aforesaid Geyer and Le Roy patents, however, have drawbacks similar to those mentioned earlier herein in connection with the Parshall et al. and Frenkel patents in that they have limited mixing/working capabilities unless they are extremely long and costly and, in the cylindrical rotor/barrel form, they have limited flexibility. Although putting the mixing/working zones of such extruders into frusto-conical rotor/barrel form adds flexibility to such extruders, allowing a greater variety of media to be mixed/worked, this is achieved at a detriment to the quality of the mixing/working capabilities of such extruders.

Still another approach to the problem of obtaining higher mixing/working capabilities and greater flexibility in extruders is represented by the approach taken in U.S. Pat. Nos. 4,178,104 and 4,199,263 to H. G. L. Menges et al. In this case groups of obstacles (pins) which are carried by the barrel and penetrate into the grooves of the rotor are arranged at selected radial planes in the extruder. The pins create turbulence in the material flowing through the extruder to mix and work the same, and the depths of penetration of the pins can be selectively varied to accommodate different media to be processed. Although this approach provides increased flexibility to the extruders, the degree of mixing/working occurring at each obstacle plane is limited and numerous such planes are required to properly mix or work the material being processed. This, again, results in expensive, extremely long (high L/D ratio) extruders.

It is, therefore, a primary object of this invention to provide an improved, relatively compact extruder having greater media mixing and working capabilities and greater flexibility for handling a variety of different media than has heretofore been available.

An additional object of this invention is to provide an extruder in which improved control over the temperature of the extrudate is obtained without sacrifice to the throughput or quality of the extrudate.

It is a further object of this invention to provide an improved extruder in which the material being mixed or worked is transferred layer by layer from rotor grooves to barrel grooves, and vice versa, and in which further extensive mixing and working is done to such material during its passage through the barrel grooves.

Yet another object of this invention is to provide an improved extruder in which the amount of mixing of, or work done to, the material being processed while the same is in the barrel grooves can be selectively varied.

Further objects and advantages of this invention will become apparent as the following description proceeds.

Briefly stated, and in accordance with one embodiment of this invention, there is provided an extruder, including a rotor and a barrel, having at least one mixing or working zone therein in which the material being mixed or worked is transferred layer by layer from upstream grooves in the rotor to input grooves in the barrel, and from output grooves in the barrel, which grooves are interleaved with the input grooves, layer by layer back to downstream grooves in the rotor. The input and output grooves of the barrel are intercommunicated by means of corresponding channels each of which has a selectively radially movable throttling member positioned therein for varying the cross-sectional opening of the channel in which it is positioned and, thus, the amount of shearing action and work performed on the material passing through such channel.

While the specification concludes with claims particularly pointing out and distinctly claiming the subject matter regarded as this invention, it is believed that the invention will be better understood from the following description taken in conjunction with the accompanying drawings, in which:

Figure 2:
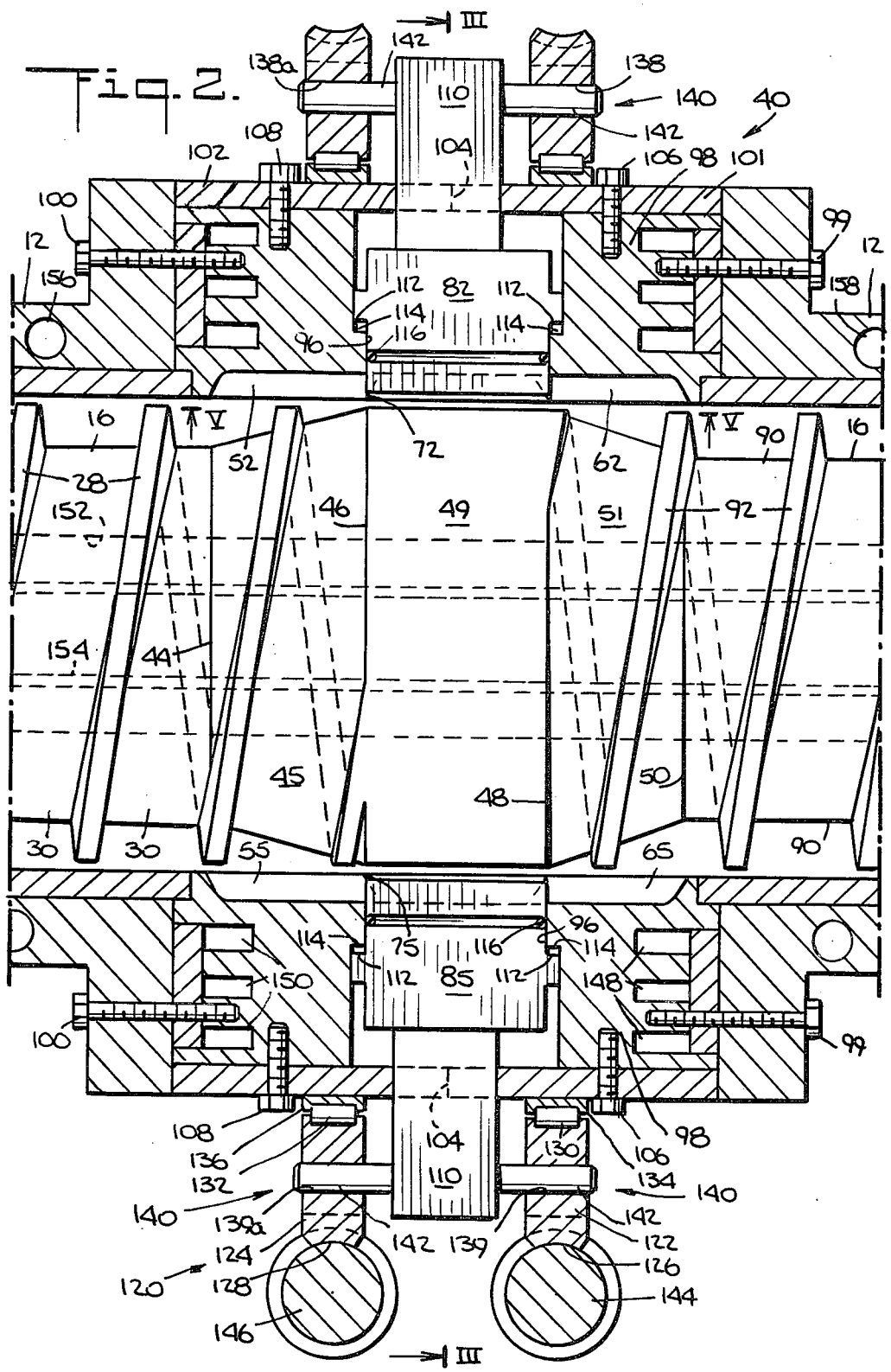
FIG. 2 is an enlarged side elevational view, with parts cut away for clarity, of a mixing/working zone of the extruder shown in FIG. 1.
Figure 4:
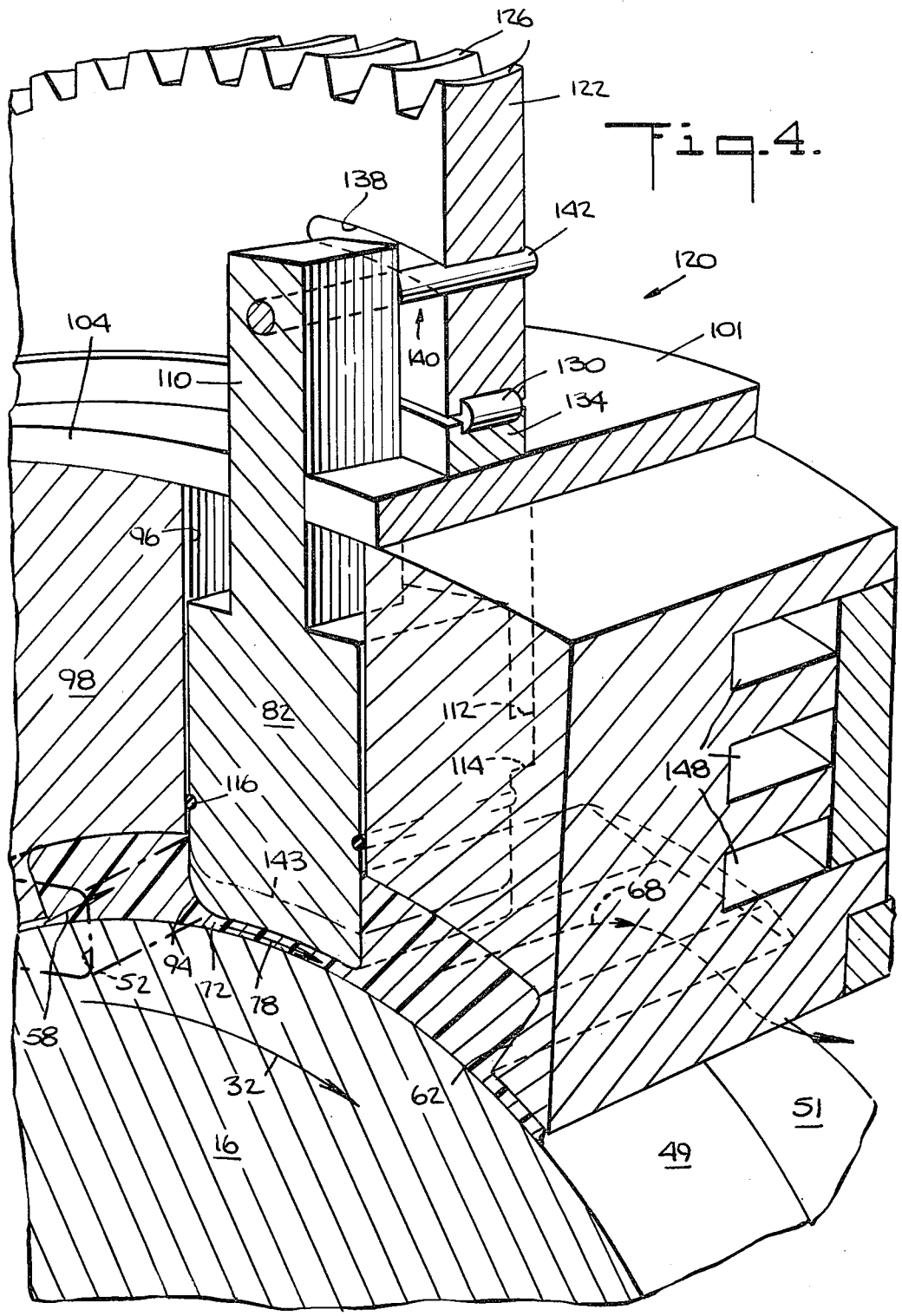

FIG. 4 is an enlarged perspective view, with portions cut away for clarity, of a portion of a mixing/working zone, showing details of a radially movable throttling member or wedge positioned in a circumferential channel of the barrel; and FIG. 5 is a plan view, taken along the line V—V of FIG. 2, showing the input and output barrel grooves and the circumferential channels which interconnect such grooves.

Figure 1:
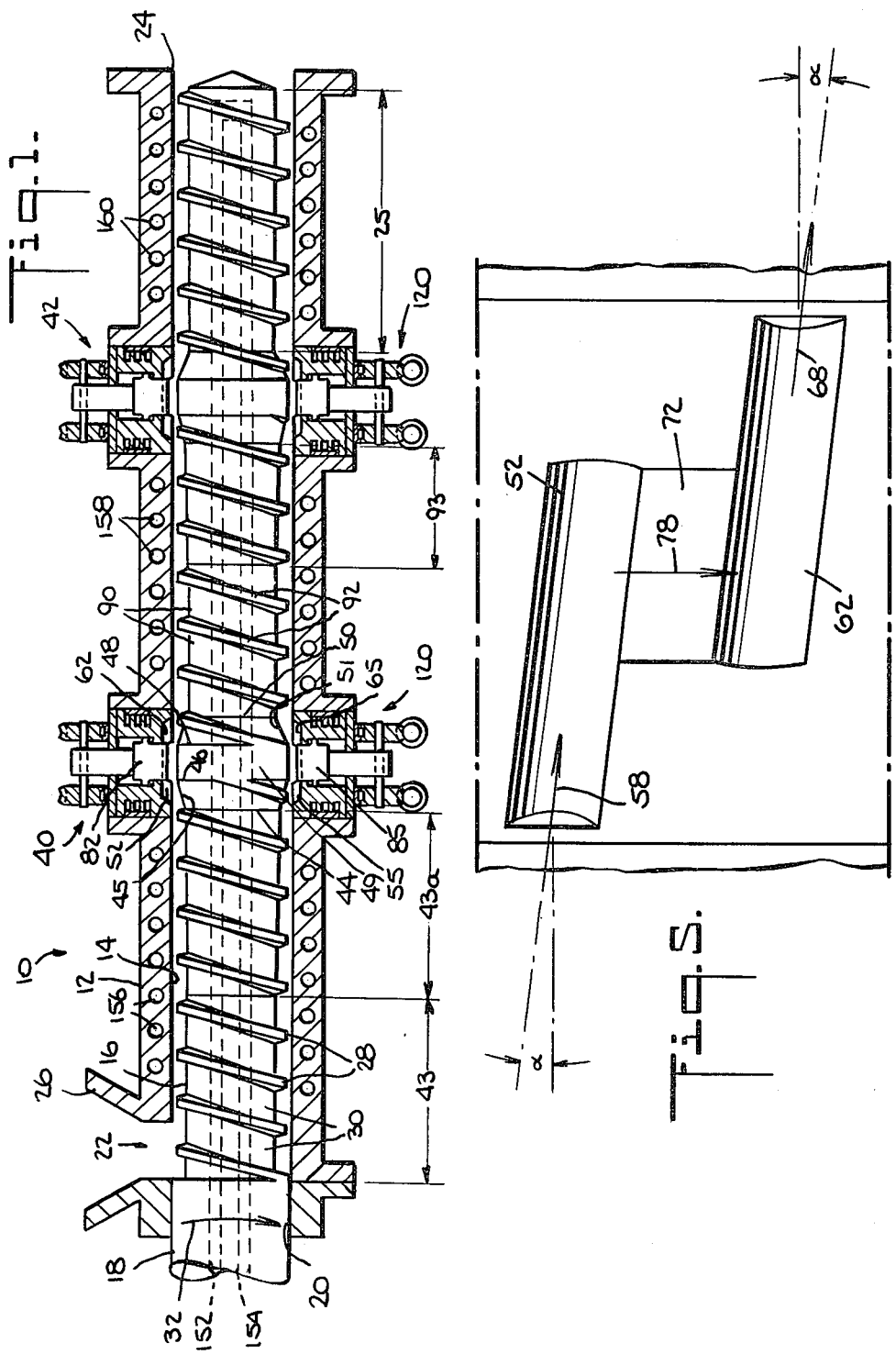
FIG. 1 is a side elevational view, with parts cut away for clarity, of an improved extruder made in accordance with this invention.

Referring to the drawings (particularly FIG. 1), an extrusion apparatus or extruder in accordance with one embodiment of this invention is shown generally at 10. The extruder 10 includes a barrel or stator 12 having a bore 14 extending therethrough. A rotor or screw 16 is rotatably mounted in the bore 14. The rotor 16 is adapted to be rotated by means of a motor and reduction gears (not shown) which are coupled to an extension 18 of the rotor 16 which extends through an opening 20 at the end of the barrel.

The barrel 12 is provided with an opening, shown generally at 22, in the top thereof, remote from the discharge end 24 of the barrel 12, through which stock to be mixed may be introduced into the extruder. A funnel shaped hopper 26 surrounds the opening 22 to facilitate introduction of the stock.

The rotor 16 is provided with helical threads or screw flights 28. Stock introduced through the opening 22 occupies grooves 30 formed between the threads 28, and rotation of the rotor 16 in the direction of the arrow 32 forces the stock towards the discharge end 24 of the barrel 12. A suitable discharge device (not shown), such as a die or a pelletizer, may be provided at the discharge end 24 of the barrel in accordance with known practices, and the downstream end portion of the extruder 10 may be provided with the usual metering or delivery zone 25 therein.

The extruder 10 is provided with at least one, and in the present embodiment two, mixing/working zones, shown generally at 40 and 42, at which selectively variable amounts of intensive mixing or working of the stock can be accomplished. More than one mixing/working zone is required in the case of certain hard stocks and in the case of stocks having fillers therein which are difficult to disperse. The two mixing/working zones 40 and 42 are substantial duplicates of one another and, accordingly, only one of such mixing/working zones will be described in detail herein.

As the stock introduced into the extruder through the opening 22 moves towards the first mixing/working zone 40, it is compacted into plug form and compressed during its movement through an inlet or feed zone 43 and a transition or compression zone 43a of the extruder. In order to facilitate the compaction and compression of the stock in transition zone 43a, the root diameter of the rotor 16 preferably increases in this zone in accordance with known practices.

Upon reaching the vicinity of the input to the mixing/working zone 40, an abrupt change in the rate of increase of the root diameter of the screw is encountered, at point 44, and the root diameter of the screw increases to the full screw diameter in a relatively short axial extent of the screw, the upstream location of the start of the full diameter portion of the screw being shown at point 46 (FIG. 2) on the input side of the mixing/working zone 40. The rapidly increasing root diameter portion of the screw is shown at 45. The full screw diameter is maintained in the axially downstream direction of the screw until the start of the output portion of the mixing/working zone 40, which begins at point 48, and, thereafter, the root diameter of the screw decreases rapidly over a short axial extent thereof until the root diameter of the screw shown at point 50 is reached at the output end of the output side of the mixing/working zone 40. The full diameter portion of the rotor is shown at 49 and the rapidly decreasing root diameter portion of the screw is shown at 51.

The barrel portion of the mixing/working zone 40 is provided with a plurality of circumferentially spaced input grooves 52-57 (FIG. 3) which are blind-ended at their downstream ends and a plurality of circumferentially spaced output grooves 62-67, which output grooves are interleaved with the input grooves 52-57 over a portion of their axial lengths and are blind-ended at their upstream ends. The input grooves 52-57 and output grooves 62-67 are preferably at a slight angle $\alpha$, for example about 7° (see FIG. 5), to the longitudinal axis of the extruder to provide a self-cleaning feature therefor in connection with stock change-overs. In alternate forms of the invention the grooves 52-57 and 62-67 may be arranged parallel to the longitudinal axis of the extruder or may be helically arranged at lesser or greater $\alpha$ angles than 7° to such axis without departing from this invention in its broader aspects. The interleaved portions of the input grooves 52-57 and output grooves 62-67 overlay the full diameter portion 49 of the rotor. In addition, the upstream portions of input grooves 52-57 overlay the rapidly increasing root diameter portion 45 of the rotor, and the downstream portions of the output grooves 62-67 overlay the rapidly decreasing root diameter portion 51 of the rotor.

The interleaved portions of input grooves 52–57 and output grooves 62–67 are intercommunicated by means of respective circumferential channels 72–77, each of which has a respective, selectively radially movable throttling member or wedge 82–87 positioned therein for varying the cross-sectional opening of the channel in which it is positioned. The variations in cross-sectional openings of channels 72–77 control the amount of shearing action and work performed on the stock passing through such channels.

In operation, material is fed into the extruder 10 through the hopper 26 and opening 22. It is then compacted intp plug form and compressed during movement through the feed and compression zones 43 and 43a of the extruder, until it reaches the rapidly increasing root diameter portion 45 of the screw on the input side of the mixing/working zone 40. Further movement downstream of the stock results in layer-by-layer shearing, and consequent mixing and working, of the stock by the input grooves 52–57, and movement of the sheared stock into the upstream portion of the input grooves 52–57. The stock then moves downstream in the grooves 52–57, toward the blind-ended downstream ends thereof, and then moves circumferentially of the barrel through the circumferential channels 72–77, beneath the wedges 82–87. The wedges 82–87 act as variably positionable barriers to the flow of stock through channels 72–77, generating high shear energy and further mixing and working of the stock in channels 72–77. After passing through the channels 72–77, the stock enters the blind-ended upstream portions of the output grooves 62–67 and moves downstream through these grooves. Continued movement downstream of the stock in the output grooves 62–67 results in the stock moving out of these grooves, onto the rapidly decreasing root diameter portion 51 of the screw, and into a second set of rotor grooves 90 formed by a second helical thread or screw flight 92 formed on the rotor, which thread 92 is positioned between the first mixing/working zone 40 and the second mixing/working zone 42. The directions of flow of stock through input grooves 52–57, circumferential channels 72–77 and output grooves 62–67 are shown in FIGS. 4 and 5 by directional arrows 58, 78 and 68, respectively.

The stock exiting from the output grooves 62–67 of the first mixing/working zone 40 is sheared layer-by-layer from these grooves as it enters onto the rapidly decreasing root diameter portion 51 of the rotor by the second helical thread 92 of the rotor, adding to the total amount of mixing and working of the stock performed in the mixing/working zone 40.

The rapidly increasing root diameter portion 45 of the rotor and the rapidly decreasing root diameter portion 51 of the rotor have each been illustrated in FIG. 2 as encompassing an axial distance corresponding to about one full turn of the respective helical screws 28 and 92 of the rotor. The axial extents of the portions 45 and 51 could be increased or decreased from the distances shown, in accordance with alternate embodiments of this invention, without departing from this invention in its broader aspects. Similarly, the upstream portions of the input grooves 52–57, overlying the rotor portion 45, and the downstream portions of the output grooves 62–67, overlying the rotor portion 51, could be correspondingly lengthened or shortened in like manner without departing from the broader aspects of this invention.

In addition, the depths of the upstream portions of the input grooves 52–57 and the downstream portions of the output grooves 62–67 can be changed from that which is shown to ones in which, in the case of the upstream portions of input grooves 52–57, the depth varies progressively from a zero depth at the input to the grooves to a full depth at a point overlaying the upstream start of the full diameter portion 49 of the rotor, and in the case of the downstream portions of output grooves 62–67, the depth varies progressively from the full diameter shown for these grooves at a point overlaying the downstream end of full diameter portion 49 of the rotor down to zero depth at the downstream ends of grooves 62–67. Alternatively, in place of progressively varying the depths of the input grooves 52–57 and output grooves 62–67, the cross-sectional areas of the grooves in the corresponding portions of the grooves can be progressively varied by progressively correspondingly changing the widths of the grooves 52–57 and 62–67, rather than the depths of such grooves, without departing from the broader aspects of this invention.

In order to avoid back pressure against the stock flowing downstream from the output grooves 62–67 into the grooves 90 on that section of the rotor which extends between mixing/working zone 40 and mixing/working zone 42, the depth of the grooves 90 immediately downstream of the rapidly decreasing root diameter portion 51 of the rotor is greater than the depth of the grooves 30 in the rotor immediately upstream of the rapidly increasing root diameter portion 45 of the rotor. Preferably, the clearance between the inner bore 14 of the barrel and the root diameter of the rotor immediately downstream of mixing/working zone 40 is about 1.17 times the clearance existing between the inner bore 14 of the barrel and the root diameter of the rotor in the portion thereof immediately upstream of the mixing/working zone 40.

The downstream portion of the rotor 16 between the first mixing/working zone 40 and the second mixing/working zone 42 is provided with a second transition or compression zone 93 for recompacting and re-compressing the stock prior to its entry into the second mixing/working zone 42 when such a second mixing/working zone is employed in the extruder.

Considering now the radially movable wedges 82–87 and the manner in which they are selectively radially moved to vary the cross-sectional areas in the corresponding channels 72–77, it will be noted that each of the wedges 82–87 is essentially similar in nature. Accordingly, this discussion will continue with a description of wedge 82 and its environs, it being understood that the constructions employed for wedges 83–87 and their environs are similar to those being described for wedge 82 and its environs.

Figure 3:
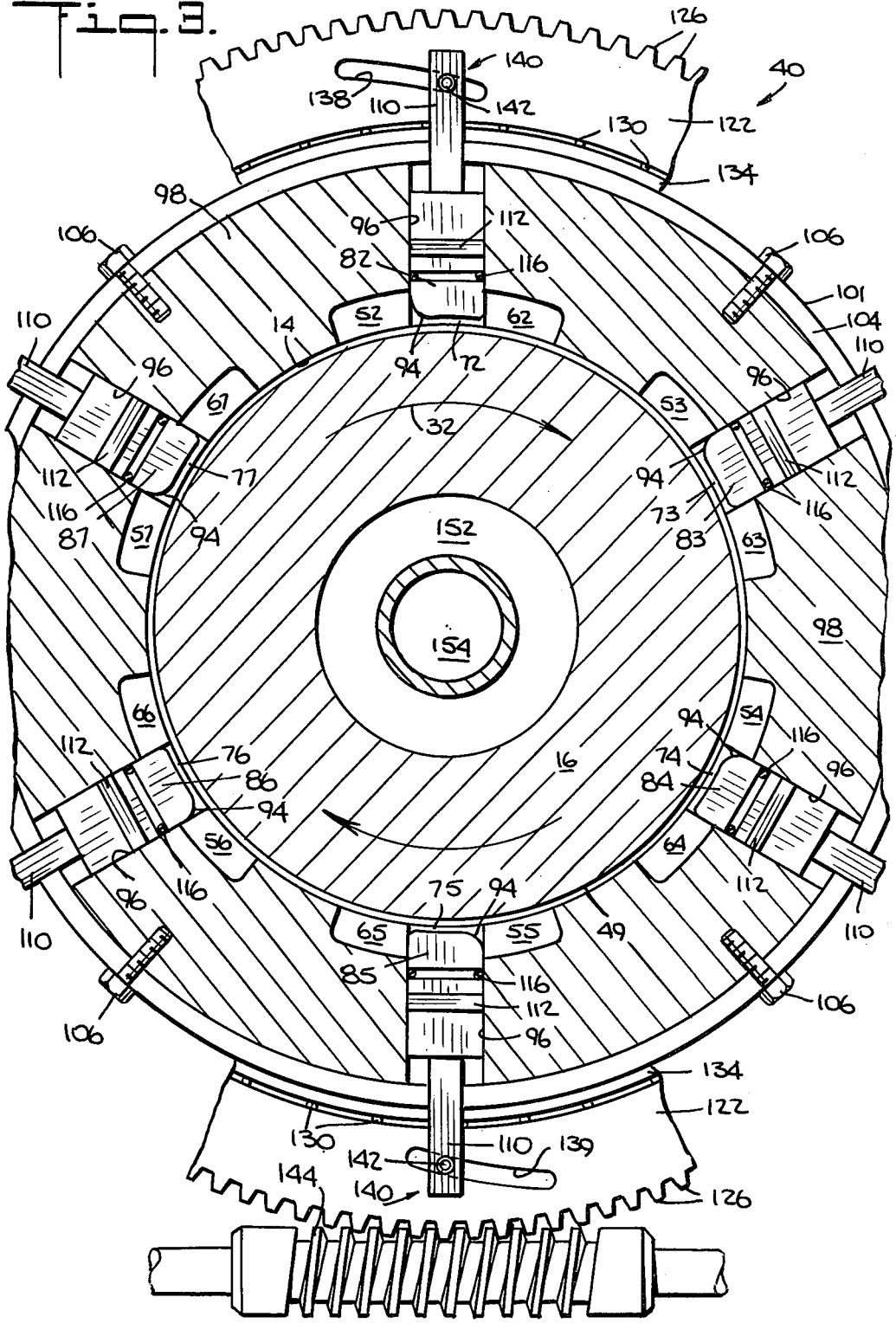
FIG. 3 is a cross-sectional view of the mixing/working zone of the extruder, taken along the line III—III of FIG. 2.

Referring more particularly to FIGS. 2–4, the wedge 82 is generally trapezoidal or rectangular in cross-section, depending on the angle α of the input groove 52 and the output groove 62, and is provided with a chamfer 94 at its radially inner upstream edge portion, at the entrance to channel 72, to facilitate the movement of stock from the downstream portion of input groove 52 into the channel 72. The wedge 82 is movable radially in a correspondingly trapezoidally or rectangularly-shaped opening 96 in a housing 98 positioned between the upstream and downstream portions of the barrel 12 located on either side of the mixing/working zone 40.

The housing 98 is bolted to the upstream and downstream portions of barrel 12 by means of bolts 99, 100.

A two-part retainer ring 101, 102, the separate parts of which axially abut each other at the interface 104, surrounds the housing 98 and is bolted thereto by respective series of bolts 106, 108. The retainer rings 101 and 102 surround a reduced cross-sectional area, radially outer portion 110 of the wedges 82-87, allowing the wedges to move radially with respect thereto. The retainer rings 101 and 102 also serve to enclose the radially outer portion of the openings 96 in the housing 98.

The wedges 82-87 are each provided on their radially inner, enlarged cross-sectional area portion with axially extending lips 112 which cooperate with flanges 114 formed on the inner periphery of the openings 96 to limit the radially inward movement of the wedges 82-87. A suitable sealing means, for example an "O"-ring 116, serves to prevent stock from flowing from channel 72 around the wedge 82 and into the radially outer portion of rectangular opening 96.

In order to minimize wear on the stock working surfaces of the extruder, it is desirable to face-harden such surfaces in accordance with known practices. Preferably, the exposed portions of the wedges 82-87, the input grooves 52-57, the output grooves 62-67, the channels 72-77 and the outer surface of the rotor 16 will be face-hardened, for example, by chrome plating, Stelliting or other conventional face-hardening technique.

A means for radially moving the throttling members or wedges 82-87 to selected positions between their radially innermost and outermost limits has been shown generally at 120. The wedge-moving means 120 includes a pair of axially spaced camming members 122, 124 having respective gear teeth 126, 128 formed on their outer peripheries. The camming members 122, 124 are rotatably carried on retainer ring parts 101, 102, respectively, by means of respective roller bearings 130, 132, which rotate on respective inner races 134, 136. The races 134, 136 are welded or otherwise fastened to the respective retainer ring portions 101, 102. The camming members 122, 124 are provided with axially aligned pairs of camming slots, two of which pairs of camming slots are shown at 138, 138a and 139, 139a, there being a pair of camming slots provided in camming members 122, 124 to cooperate with each of the wedges 82-87.

Cam follower means, shown generally at 140, are employed to synchronously move the wedges 82-87 radially in response to angular movement of the camming members 122, 124. A cam follower means 140 is provided for each radially movable wedge 82-87. Each cam follower means 140 includes an axial cam follower rod 142 fixedly carried by the movable wedges 82-87. The end portions of the cam follower rods 142 extend axially upstream and downstream from the outer portions 110 of the wedges 82-87 into engagement with the pairs of camming slots 138, 138a and 139, 139a. The end portions of the rods 142 engage and ride on hard-faced camming surfaces of the pairs of slots 138, 138a and 139, 139a so that, upon angular movement of camming members 122, 124, the cam follower rods 142, and consequently the wedges 82-87, will be synchronously moved radially in equal amounts by the camming surfaces of the camming slots 138, 138a, 139, 139a. The motion of the wedges is constrained to a generally radial direction by the openings 96 and the two-part retaining plate 101, 102.

Camming members 122, 124 are rotated or angularly moved by means of respective worm gears 144, 146, the teeth of which are in engagement with the respective teeth 126, 128 of camming members 122, 124. A suitable hydraulic or electric drive motor and gear system (not shown) may be employed to provide predetermined amounts of rotation of the worm gears 144, 146 and, thus, predetermined angular rotation of the camming members 122, 124 to thus concurrently, selectively, radially position the wedges 82-87 with respect to housing 98 and cause a predetermined amount of opening or closing of the channels 72-77. Referring to FIG. 4, the broken line 143 represents one of the intermediate positions that the radially inner surface of wedge 82 may assume upon selective rotation of the camming members 122, 124 from the position shown in FIG. 4 to a predetermined new position.

Suitable known electrical and fluid control circuits (not shown) may be provided to either manually control the drive motor of worm gears 144, 146, or to automatically control the same via sensors (not shown) which may be responsive to physical characteristics (e.g., temperature, pressure, viscosity) of the extrudate coming from the extruder.

Cooling channels 148, 150 are provided at opposite sides of housing 98 to facilitate cooling of the mixing-/working zone 40 during normal operation. Suitable cooling supply and exhaust piping, pumps and controls (not shown) for the coolant would be provided in a known manner. Depending on the stock being mixed or worked, the cooling channels 148, 150 could be supplied with a heating fluid, rather than a coolant, to add thermal energy to the stock instead of cooling it.

Similarly, the rotor 16 is provided with cooling channels 152, 154 centrally thereof to facilitate cooling of the same. Coolant may be provided via a conventional rotary coupling device (not shown) to one of the channels 152, 154 and removed via the other of the channels. Where desired in the case of particular stocks, a heating fluid can be substituted for the coolant to add thermal energy to the stock rather than remove it. The stator 12 may also be provided with cooling/heating channels 156, 158, 160 in accordance with known practices.

From the foregoing description, it will be apparent that this invention provides an improved extruder in which the amount of mixing of, or work done to, the material being processed can be selectively varied while the material is in the barrel grooves of the extruder to provide improved control over the temperature and/or other physical characteristics of the extrudate.

While particular embodiments of this invention have been shown and described, it will be apparent to those skilled in the art that various changes and modifications may be made without departing from this invention in its broader aspects. As one example thereof, the means 120 for radially moving the throttling members or wedges to selected positions between their radially innermost and outermost limits could comprise an axially movable ring having axially directed camming surfaces which concurrently engage the outer portions of the throttling members to selectively position them in response to axial movement of the ring. Other examples will be readily apparent to those skilled in the art. It is, therefore, aimed in the appended claims to cover all such changes and modifications as fall within the true spirit and scope of this invention.

Having thus described the invention, what is claimed as new and desired to be protected by Letters Patent of the United States is:

1. An extruder, including an elongated rotor and a cylindrical barrel surrounding said rotor, said extruder having a feed zone, a metering zone and at least one mixing or working zone positioned between said feed zone and said metering zone, the rotor in said mixing or working zone including an upstream groove-forming flighted portion, a downstream groove-forming flighted portion and a substantially unflighted enlarged root diameter portion intermediate said upstream and downstream flighted portions, the barrel in said mixing or working zone including on an inner surface thereof upstream input grooves open to and at least in part overlaying the grooves in said upstream flighted portion of said rotor and downstream output grooves open to and at least in part overlaying the grooves in said downstream flighted portion of said rotor for respectively receiving from the upstream groove-forming flighted portion of the rotor and delivering to the downstream groove forming flighted portion of the rotor substantially all of the material comprising the throughput of the extruder, channel means intercommunicating said input and output grooves for receiving substantially all of said throughput from said input grooves and delivering said throughput to said output grooves, and throttling means positioned in said channel means and cooperative with said unflighted portion of said rotor for varying the cross-sectional area of said channel means, thereby to vary the amount of shearing action and work performed on said throughput material passing through such channel means.

2. An extruder as described in claim 1, wherein said input grooves and output grooves of said barrel are generally axially directed and include portions thereof which overlay said substantially unflighted portion of said rotor.

3. An extruder as described in claim 2, wherein the portions of said input and output grooves of the barrel which overlay the substantially unflighted portion of the rotor are circumferentially spaced from and interleaved with one another.

4. An extruder as described in claim 3, wherein the grooves on said rotor portions and the input and output grooves in said barrel are helically oriented.

5. An extruder as described in claim 3, wherein said channel means comprises a plurality of circumferentially oriented passageways which overlay and face the substantially unflighted portion of the rotor, said passageways intersecting at approximately 90° angles with and interconnecting the interleaved, circumferentially spaced portions of corresponding input and output grooves of said barrel.

6. An extruder as described in claim 5, wherein said throttling means comprises a plurality of radially movable wedge members, there being one of said wedge members positioned in each of said passageways.

7. An extruder as described in claim 6 and further including camming means carried by said barrel for concurrently moving said wedge members to selected corresponding positions between their radially innermost positions and their radially outermost positions.

8. An extruder as described in claim 3, wherein said throttling means comprises a radially movable wedge member.

9. An extruder as described in claim 8 and further including camming means carried by said barrel for moving said wedge member to selected positions between a radially innermost position and a radially outermost position.

10. An extruder, including an elongated rotor and a cylindrical barrel surrounding said rotor, said extruder having a feed zone, a metering zone and at least one mixing or working zone positioned between said feed zone and said metering zone; the rotor in said mixing or working zone including an upstream groove-forming flighted portion, a downstream groove-forming flighted portion and a substantially unflighted portion intermediate said upstream and downstream flighted portions; the barrel in said mixing or working zone including on an inner surface thereof upstream input grooves open to and at least in part overlaying the grooves in said upstream flighted portion of said rotor and downstream output grooves open to and at least in part overlaying the grooves in said downstream flighted portion of said rotor, said input grooves and output grooves of said barrel each including portions thereof which overlay said substantially unflighted portion of said rotor, the portions of said input and output grooves of the barrel which overlay the substantially unflighted portion of the rotor being circumferentially spaced from and interleaved with one another; cahnnel means intercommunicating said input and output grooves, said channel means comprising a plurality of circumferentially oriented passageways which overlay and face the substantially unflighted portion of the rotor and interconnect the interleaved, circumferentially spaced portions of corresponding input and output grooves of said barrel; throttling means positioned in said channel means for varying the cross-sectional area of said channel means to thereby vary the amount of shearing action and work performed on material passing through such channel means, said throttling means comprising a plurality of radially movable wedge members, there being one of said wedge members positioned in each of said passageways; camming means carried by said barrel for concurrently moving said wedge members to selected corresponding positions between their radially innermost positions and their radially outermost positions, said camming means including at least one camming ring rotatably positioned on said barrel, said camming ring including a plurality of camming slots therein, there being one of said camming slots for each of said wedge members, said camming ring further including gear tooth means fixedly positioned thereon, said wedge members each including a cam follower fixed thereto, said cam followers being in engagement with corresponding ones of said camming slots; and drive means including a worm gear in engagement with the gear tooth means on said camming ring for rotating said camming ring to thereby concurrently radially move said wedge members.

* * * * *